United States Patent
Kumano et al.

(10) Patent No.: US 11,429,693 B2
(45) Date of Patent: Aug. 30, 2022

(54) INFORMATION PROCESSING DEVICE, INFORMATION PROCESSING METHOD, AND PROGRAM

(71) Applicants: MITSUBISHI HEAVY INDUSTRIES, LTD., Tokyo (JP); Mitsubishi Hitachi Power Systems, Ltd., Yokohama (JP)

(72) Inventors: Shintaro Kumano, Tokyo (JP); Makoto Kishi, Tokyo (JP); Keisuke Yamamoto, Tokyo (JP); Katsuhiko Abe, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 423 days.

(21) Appl. No.: 16/496,683

(22) PCT Filed: Mar. 26, 2018

(86) PCT No.: PCT/JP2018/011976
§ 371 (c)(1),
(2) Date: Sep. 23, 2019

(87) PCT Pub. No.: WO2018/181093
PCT Pub. Date: Oct. 4, 2018

(65) Prior Publication Data
US 2020/0034407 A1    Jan. 30, 2020

(30) Foreign Application Priority Data
Mar. 29, 2017 (JP) ............................. JP2017-065894

(51) Int. Cl.
*G06F 17/18* (2006.01)
*G01D 21/02* (2006.01)
*G06N 7/00* (2006.01)

(52) U.S. Cl.
CPC ............. *G06F 17/18* (2013.01); *G01D 21/02* (2013.01); *G06N 7/00* (2013.01)

(58) Field of Classification Search
CPC ........... G06F 17/18; G01D 21/02; G06N 7/00
See application file for complete search history.

(56) References Cited

U.S. PATENT DOCUMENTS

| 2015/0112891 A1 | 4/2015 | Watanabe et al. |
| 2016/0004794 A1 | 1/2016 | Reimann et al. |

FOREIGN PATENT DOCUMENTS

| CN | 104364805 A | 2/2015 | |
| EP | 2615561 A1 * | 7/2013 | ............. G06F 17/18 |

(Continued)

OTHER PUBLICATIONS

International Search Report dated Jun. 12, 2018, issued in counterpart Application No. PCT/JP2018/011976, with English translation (2 pages).

(Continued)

*Primary Examiner* — Natalie Huls
*Assistant Examiner* — Sharad Timilsina
(74) *Attorney, Agent, or Firm* — WHDA, LLP

(57) ABSTRACT

In an information processing device according to the present invention, an estimation unit is configured to estimate each of a plurality of estimation values related to a target state quantity by using a plurality of models for explaining a target device. A probability specification unit is configured to specify each of a plurality of probabilities corresponding to the plurality of estimation values on the basis of a probability distribution of values of state quantities related to the target state quantity. A management value specification unit is configured to specify a value to be used for management of the target device on the basis of the plurality of estimation values and the plurality of probabilities.

11 Claims, 11 Drawing Sheets

(56) References Cited

FOREIGN PATENT DOCUMENTS

| | | | |
|---|---|---|---|
| EP | 2717217 A1 | 4/2014 | |
| JP | 64-015808 A | 1/1989 | |
| JP | 64015808 A * | 1/1989 | ............ G05B 23/02 |
| JP | 2007-233639 A | 9/2007 | |
| JP | 2009-205464 A | 9/2009 | |
| JP | 2009-222332 A | 10/2009 | |
| JP | 2011-253275 A | 12/2011 | |
| JP | 2011253275 A * | 12/2011 | |
| JP | 2014-164336 A | 9/2014 | |
| WO | 2011/114133 A1 | 9/2011 | |

OTHER PUBLICATIONS

Written Opinion dated Jun. 12, 2018, issued in counterpart Application No. PCT/JP2018/011976, with English Translation (7 pages).

* cited by examiner

|  | THE AMOUNT OF NOx EMISSION | ELECTRICITY SALES REVENUES | TEMPERATURE OF EXHAUST GAS |
|---|---|---|---|
| e1 | ○ | × | × |
| e2 | ○ | × | ○ |

INFORMATION PROCESSING DEVICE, INFORMATION PROCESSING METHOD, AND PROGRAM

TECHNICAL FIELD

The present invention relates to an information processing device, an information processing method, and a program.

The application is based on Japanese Patent Application No. 2017-065894 filed on Mar. 29, 2017, the content of which is incorporated herein by reference.

BACKGROUND ART

In a plant such as a power generation plant, it is conceivable that a monitoring device collects state quantity values of a target device constituting the plant such as a temperature and a pressure at the time of the operation of the target device, and the collected state quantities be used for the maintenance, monitoring, and the like of the device.

It has been proposed that the monitoring device processes the collected state quantities such that an operator of the device can easily use them and execute the maintenance, monitoring, and the like of the device. For example, in Patent Document 1, it is proposed that, when a computer detects omission portions of collected state quantities of an industrial plant, the computer executes a complementary process and calculates values of the omission state quantities.

In addition, it is known that modes such as a physical model and a statistical model are used when values of omission state quantities are set through a complementary process.

CITATION LIST

Patent Documents

Patent Document 1

United States Patent Application, Publication No. 2016/0004794

SUMMARY OF INVENTION

Technical Problem

Patent Document 1 discloses that an information processing device executes a complementary process to complement a value of an omission state quantity, but does not disclose a specific method of setting a value of an omission state quantity.

In addition, although a value taken by a state quantity of a device follows a fixed probability distribution, a value of an omission state quantity is not set on the basis of an estimation value of a state quantity estimated using each of models in consideration of such a probability distribution.

The present invention is contrived in view of the above-described problems, and an object thereof is to appropriately set state quantity values used for the management of a target device on the basis of an estimation value of a state quantity calculated using a plurality of models in consideration of a probability distribution of values of state quantities.

Solution to Problem

According to a first aspect of the present invention, an information processing device includes an estimation unit which is configured to estimate each of a plurality of estimation values related to a target state quantity by using a plurality of models for explaining a target device, a probability specification unit which is configured to specify each of a plurality of probabilities corresponding to the plurality of estimation values on the basis of a probability distribution of values of state quantities related to the target state quantity, and a management value specification unit which is configured to specify a value to be used for management of the target device on the basis of the plurality of estimation values and the plurality of probabilities.

According to a second aspect of the present invention, the information processing device according to the first aspect may further include an evaluation value calculation unit which is configured to calculate each of a plurality of evaluation values which are values of evaluation items of management of the target device on the basis of the plurality of estimation values, in which the probability specification unit is configured to specify the plurality of probabilities respectively corresponding to the plurality of evaluation values on the basis of the probability distribution of the values of the evaluation items.

According to a third aspect of the present invention, in the information processing device according to the second aspect, the evaluation value calculation unit is configured to calculate each of a plurality of evaluation values for the plurality of estimation values on the basis of a plurality of values which can be taken by an unknown state quantity which is a state quantity having an unknown value, the probability specification unit is configured to specify the plurality of probabilities respectively corresponding to the plurality of evaluation values for the plurality of estimation values on the basis of a conditional probability distribution of the values of the evaluation items with a value of the unknown state quantity as a precondition, and the management value specification unit is configured to specify a value to be used for management of the target device on the basis of the sum of probabilities corresponding to the plurality of evaluation values for the plurality of estimation values.

According to a fourth aspect of the present invention, in the information processing device according to the second or third aspect, the evaluation value calculation unit is configured to calculate a plurality of evaluation values related to the evaluation items of a plurality of types on the basis of the plurality of estimation values, and the management value specification unit is configured to specify a value to be used for management of the target device on the basis of probabilities corresponding to the evaluation items of a plurality of types for each of values of the plurality of target state quantities.

According to a fifth aspect of the present invention, in the information processing device according to any one of the first to fourth aspects, the management value specification unit is configured to specify the value of the target state quantity related to the highest probability as a value to be used for management of the target device.

According to a sixth aspect of the present invention, in the information processing device according to any one of the first to fifth aspects, the plurality of models may include at least any one of a statistical model and a physical model.

According to a seventh aspect of the present invention, the information processing device according to the sixth aspect may further include a model updating unit which updates the statistical model on the basis of values of past state quantifies, in which the probability specification unit is configured to specify a probability corresponding to an estimation value estimated using the updated statistical model.

According to an eighth aspect of the present invention, an information processing method includes estimating each of a plurality of estimation values related to a target state quantity by using a plurality of models for explaining a target device, specifying each of a plurality of probabilities corresponding to the plurality of estimation values on the basis of a probability distribution of values of state quantities related to the target state quantity, and specifying a value to be used for management of the target device on the basis of the plurality of estimation values and the plurality of probabilities.

According to a ninth aspect of the present invention, a program causes a computer to estimate each of a plurality of estimation values related to a target state quantity by using a plurality of models for explaining a target device, specify each of a plurality of probabilities corresponding to the plurality of estimation values on the basis of a probability distribution of values of state quantities related to the target state quantity, and specify a value to be used for management of the target device on the basis of the plurality of estimation values and the plurality of probabilities.

Advantageous Effects of Invention

The information processing device according to at least one aspect of the above-described aspects can appropriately set a value of a state quantity to be used for management of a target device on the basis of an estimation value of a target state quantity calculated using each model in consideration of a probability distribution of values of state quantities.

DESCRIPTION OF EMBODIMENTS

First Embodiment

Hereinafter, embodiments will be described in detail with reference to the accompanying drawings.

Figure 1:
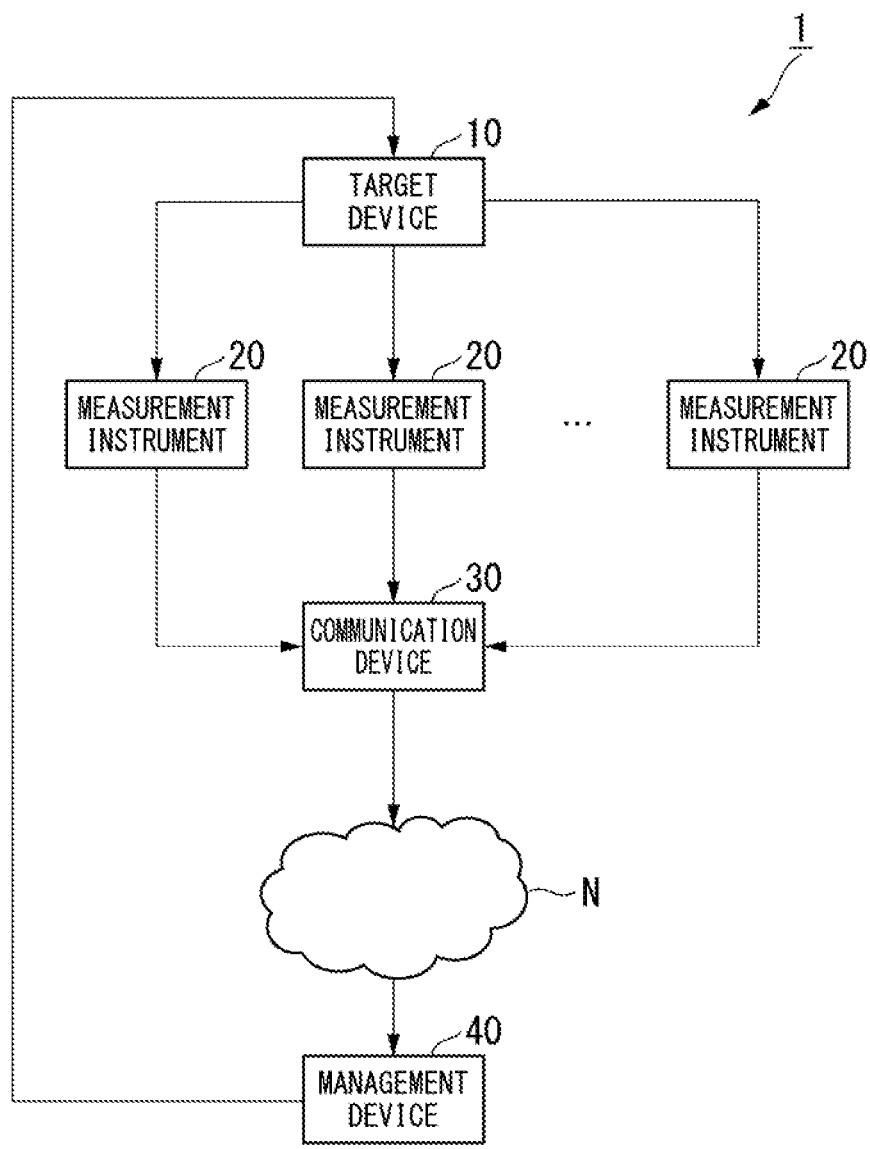
FIG. 1 is a schematic block diagram showing a configuration of a management system according to a first embodiment.

FIG. 1 is a schematic block diagram showing a configuration of a management system according to a first embodiment.

A management system 1 includes a target device 10, a plurality of measurement instruments 20, a communication device 30, and a management device 40.

The target device 10 is a device to be managed by the management device 40. Examples of the target device 10 include a gas turbine, a steam turbine, a boiler, a coal gasification furnace, and the like. In addition, the target device may be an environmental plant, a chemical plant, or a transportation system such as an aircraft.

The measurement instrument 20 is provided in the target device 10 and measures a state quantity of the target device 10.

The communication device 30 transmits a measurement value of the state quantity measured by the measurement instrument 20 to the management device 40 through a network N.

The management device 40 manages the target device 10 on the basis of the measurement value received from the communication device 30. The management device 40 is an example of an information processing device.

«Configuration of Management Device»

Figure 2:
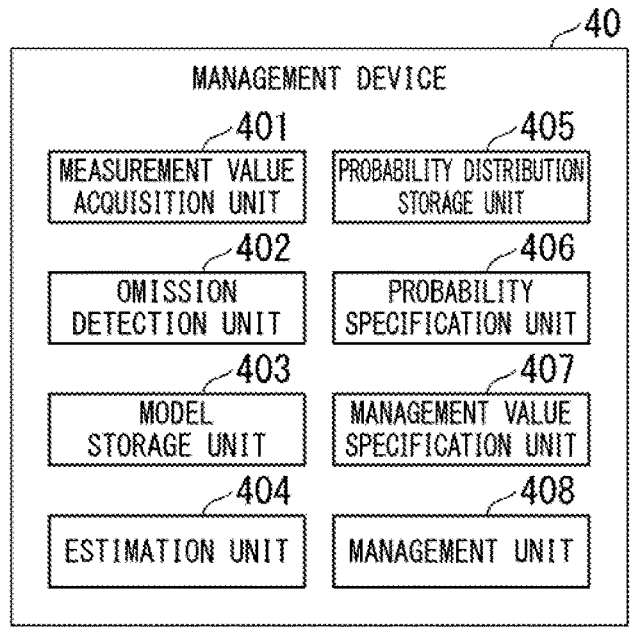
FIG. 2 is a schematic block diagram showing a configuration of a management device according to the first embodiment.

FIG. 2 is a schematic block diagram showing a configuration of the management device according to the first embodiment.

The management device 40 includes a measurement value acquisition unit 401, an omission detection unit 402, a model storage unit 403, an estimation unit 404, a probability distribution storage unit 405, a probability specification unit 406, a management value specification unit 407, and a management unit 408.

The measurement value acquisition unit 401 receives measurement values of state quantities which are measured by a plurality of measurement instruments 20 from the communication device 30.

The omission detection unit 402 detects a state quantity of which the value is omission among state quantities to be processed, on the basis of the plurality of measurement values acquired by the measurement value acquisition unit 401. Here, omission of a value refers to temporal or spatial omission. For example, in a case where the management unit 408 manages a state quantity for each time $\Delta t$, the omission detection unit 402 detects the omission of a measurement value at time $T+\Delta t$ when a measurement value at time $T$ and a measurement value at time $T+2\Delta t$ are acquired. Further, for example, in a case where the management unit 408 manages a state quantity for each distance $\Delta d$, the omission of measurement values at a position $(0, \Delta d)$, a position $(\Delta d, 0)$, a position $(\Delta d, \Delta d)$, a position $(\Delta d, 2\Delta d)$, and a position $(2\Delta d, \Delta d)$ is detected when measurement values at a position $(0, 0)$, a position $(2\Delta d, 0)$, a position $(0, 2\Delta d)$, and a position $(2\Delta d, 2\Delta d)$ are acquired.

The model storage unit 403 stores a plurality of models for explaining the movement of the target device 10. As the models, a statistical model and a physical model can be used. Additionally, a rule model and a knowledge model may be used. The statistical model is a model that statistically reproduces the movement of the target device 10 on the basis of a value of a state quantity in the past operation of the target device 10. The statistical model is updated on the basis of stored values of state quantities in a past operation. The physical model is a model that reproduces the movement of the target device 10 using a numerical expression (for example, a thermodynamic equation) that follows the laws of nature on the basis of design information of the target device 10.

The estimation unit 404 estimates a value of a state quantity for each model stored in the model storage unit 403 on the basis of a measurement value measured by the measurement value acquisition unit 401. Hereinafter, a state quantity to be estimated by the estimation unit 404 will be referred to as a target state quantity. That is, the estimation unit 404 calculates values of a plurality of target state quantities using different models.

The probability distribution storage unit 405 stores a probability distribution table in winch a value of a target state quantity and a probability of taking the value are associated with each other. The probability distribution table is obtained in advance using design information of the target device 10 or statistics of past state quantities. Meanwhile, the probability distribution storage unit 405 may store a probability distribution function instead of a probability distribution table.

The probability specification unit 406 specifies a probability of taking an estimation value of a target state quantity obtained by the estimation unit 404 for each estimation value on the basis of a probability distribution stored in the probability distribution storage unit 405.

The management value specification unit 407 selects one of a plurality of estimation values estimated by the estimation unit 404 on the basis of a probability specified by the probability specification unit 406 and sets the selected value to be a value (management value) to be used for the management of the target device 10.

The management unit 408 manages the target device 10 on the basis of a measurement value acquired by the measurement value acquisition unit 401 and a value specified by the management value specification unit 407. Examples of the management of the target device 10 include monitoring whether or not a state quantity of the target device 10 deviates from an operation allowable range, monitoring whether or not an output related to an evaluation item of the target device 10 satisfies a target, outputting a control signal to the target device 10, and the like. Examples of the evaluation item include the amount of NOx emission, electricity sales revenues, the temperature of gas, and the like.

«Operation of Management Device»

Figure 3:
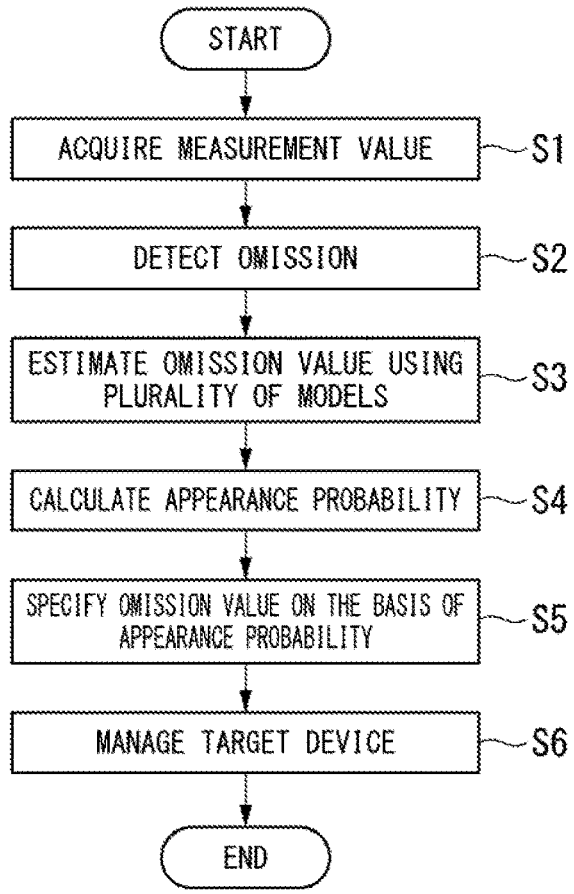
FIG. 3 is a flowchart showing operations of the management device according to the first embodiment.

FIG. 3 is a flowchart showing operations of the management device according to the first embodiment.

When the management device 40 starts to manage the target device 10, the measurement value acquisition unit 401 acquires a measurement value of a state quantity measured by the measurement instrument 20 from the communication device 30 (step S1). Next, the omission detection unit 402 detects an omission in the measurement values acquired by the measurement value acquisition unit 401 (step S2). The estimation unit 404 applies the measurement value acquired by the measurement value acquisition unit 401 to each of a plurality of models to obtain each of estimation values of state quantities (target state quantities) of which the omission has been detected (step S3).

Next, the probability specification unit 406 specifies an appearance probability of each estimation value on the basis of a probability distribution stored in the probability distribution storage unit 405 (step S4). In addition, the management value specification unit 407 specifies the highest probability among probabilities specified by the probability specification unit 406 and selects an estimation value related to the probability to specify a value of a state quantity of which the omission has been detected (step S5). In addition, the management unit 408 manages the target device 10 on the basis of the measurement value acquired by the measurement value acquisition unit 401 and the value specified by the management value specification unit 407 (step S6). In a case where the target device 10 is a gas turbine, the target device 10 is managed on the basis of specified management values, for example, by changing a gas turbine output instruction value, changing the setting of an opening of an IGV, or changing a fuel flow rate.

«Specific Example of Operation»

Here, a method of specifying a management value according to the first embodiment using a specific example will be described.

Figure 4:
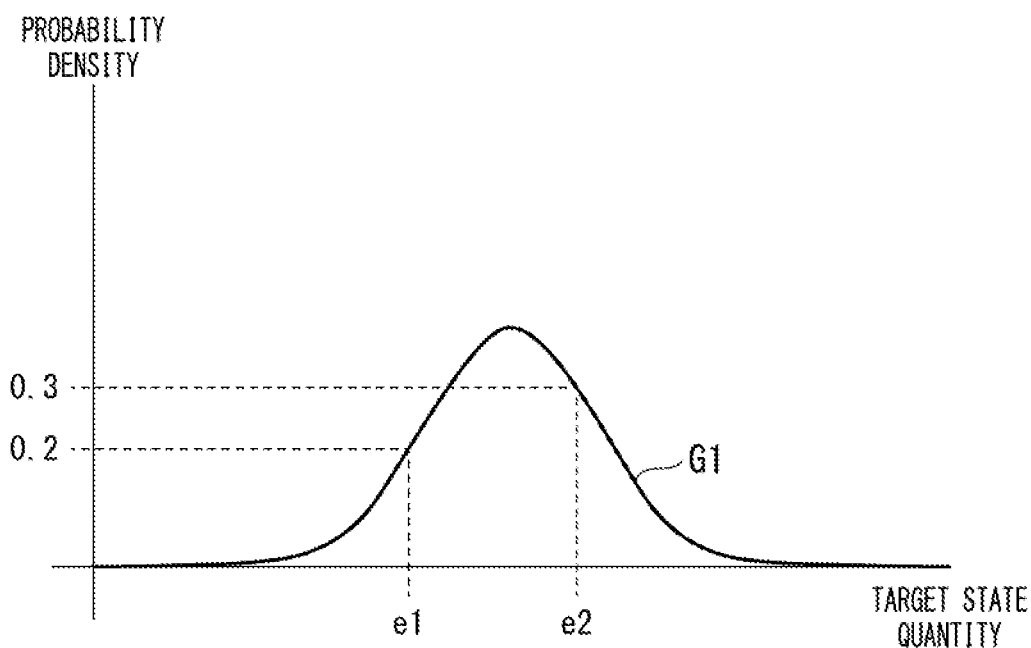
FIG. 4 is a diagram showing a specific example of a method of specifying a management value according to the first embodiment.

FIG. 4 is a diagram showing a specific example of a method of specifying a management value according to the first embodiment.

A case where a probability distribution of values of target state quantities is a distribution shown in FIG. 4 and the estimation unit 404 outputs an estimation value e1 based on a first model and an estimation value e2 based on a second model will be described. A graph G1 included in FIG. 4 is a graph in which a vertical axis represents a probability density and a horizontal axis represents a value of a target state quantity. The probability specification unit 406 obtains an appearance probability of the estimation value e1 on the basis of a probability distribution of a target state quantity. In the example shown in FIG. 4, a probability density of the appearance probability of the estimation value e1 is 0.2. In addition, the probability specification unit 406 obtains an appearance probability of the estimation value e2 on the basis of a probability distribution of a target state quantity. In the example shown in FIG. 4, a probability density of the appearance probability of the estimation value e2 is 0.3. In addition, the management value specification unit 407 specifies an estimation value related to a higher appearance probability among appearance probabilities of specified estimation values to be a management value. In the example shown in FIG. 4, since the appearance probability of the estimation value e2 is higher than the appearance probability of the estimation value e1, the management value specification unit 407 determines a management value to be the estimation value e2.

«Operations and Effects»

In this manner, according to the first embodiment, the management device 40 specifies a value to be used for the management of the target device 10 from a plurality of estimation values on the basis of a probability distribution of values of target state quantities. That is, according to the first embodiment, the management device 40 can appropriately set a value of a target state quantity to be used for the management of the target device 10 on the basis of an estimation value of a target state quantity calculated using each of models in consideration of a probability distribution of values of target state quantities.

Second Embodiment

The management device 40 according to the first embodiment sets a value of a target state quantity to be used for the management of the target device 10 on the basis of a probability distribution of values of target state quantities. On the other hand, a management device 40 according to a second embodiment sets a value of a target state quantity to be used for the management of a target device 10 on the basis of a probability distribution of values of evaluation items of management of the target device 10. Examples of the evaluation item include the amount of NOx emission, electricity sales revenues, the temperature of gas, and the like.

«Configuration of Management Device»

Figure 5:
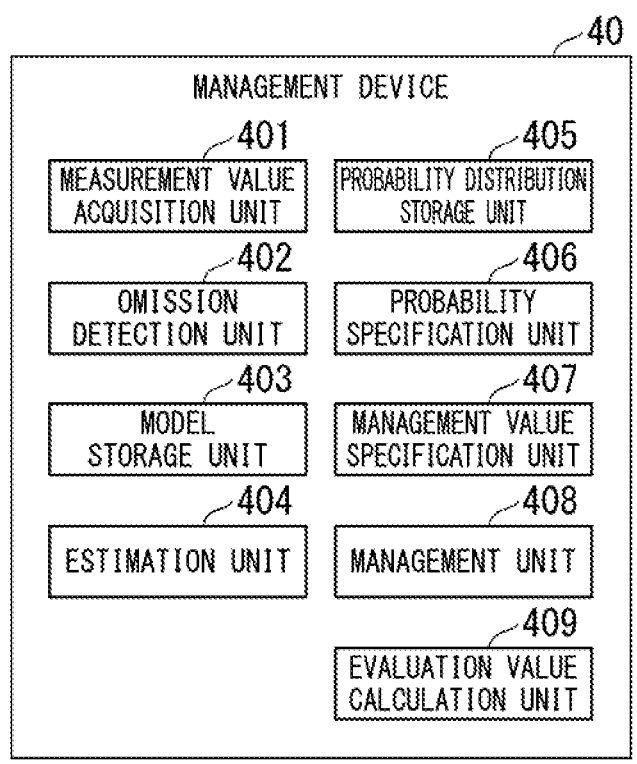
FIG. 5 is a schematic block diagram showing a configuration of a management device according to a second embodiment.

FIG. 5 is a schematic block diagram showing a configuration of a management device according to the second embodiment.

A management device 40 according to the second embodiment further includes an evaluation value calculation unit 409 in addition to components in the first embodiment. The evaluation value calculation unit 409 calculates a value of an evaluation item of the target device 10 using each of a plurality of estimation values estimated by an estimation unit 404 and a measurement value measured by a measurement value acquisition unit 401 for each of the estimation values.

A probability distribution storage unit 405 according to the second embodiment stores a probability distribution table in which a value of an evaluation item and a probability of taking the value are associated with each other.

A probability specification unit 406 according to the second embodiment specifies a probability of taking an evaluation value calculated by the evaluation value calculation unit 409 for each evaluation value on the basis of a probability distribution stored in the probability distribution storage unit 405.

«Operations of Management Device»

Figure 6:
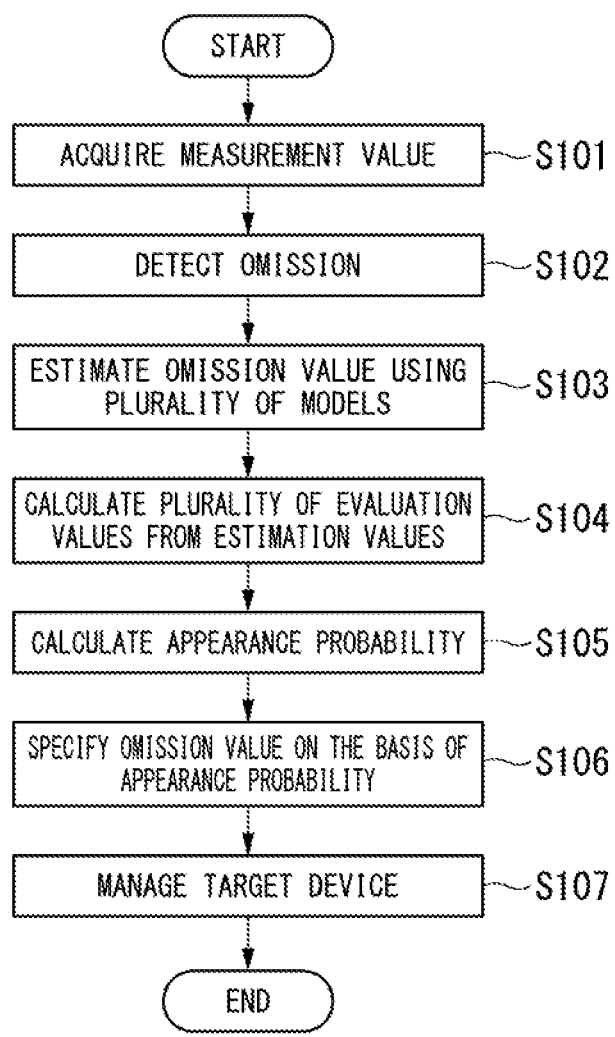
FIG. 6 is a flowchart showing operations of a management device according to a second embodiment.

FIG. 6 is a flowchart showing operations of the management device according to the second embodiment.

When the management device 40 starts to manage the target device 10, the measurement value acquisition unit 401 acquires a measurement value of a state quantity from a measurement instrument 20 from a communication device 30 (step S101). Next, the omission detection unit 402 detects the omission of a measurement value acquired by the measurement value acquisition unit 401 (step S102). The estimation unit 404 applies the measurement value acquired by the measurement value acquisition unit 401 to each of a plurality of models to obtain each of estimation values of state quantities of which the omission has been detected (step S103).

Next, the evaluation value calculation unit 409 calculates values of a plurality of evaluation items on the basis of each of a plurality of estimation values estimated by the estimation unit 404 (step S104). The value of the evaluation item can be obtained using a function having values of a plurality of state quantities as explanation variables. The evaluation value calculation unit 409 calculates an evaluation value by substituting a measurement value or an estimation value for an explanation variable of the function.

Next, the probability specification unit 406 specifies an appearance probability of each evaluation value on the basis of a probability distribution stored in the probability distribution storage unit 405 (step S105). In addition, the management value specification unit 407 specifies the highest probability among probabilities specified by the probability specification unit 406 and selects an estimation value used for the calculation of an evaluation value related to the probability to specify a value of a state quantity of which the omission has been detected (step S106). In addition, the management unit 408 manages the target device 10 on the basis of a measurement value acquired by the measurement value acquisition unit 401 and a value specified by the management value specification unit 407 (step S107).

«Specific Example of Operation»

Here, a method of specifying a management value according to the second embodiment is described using a specific example.

Figure 7:
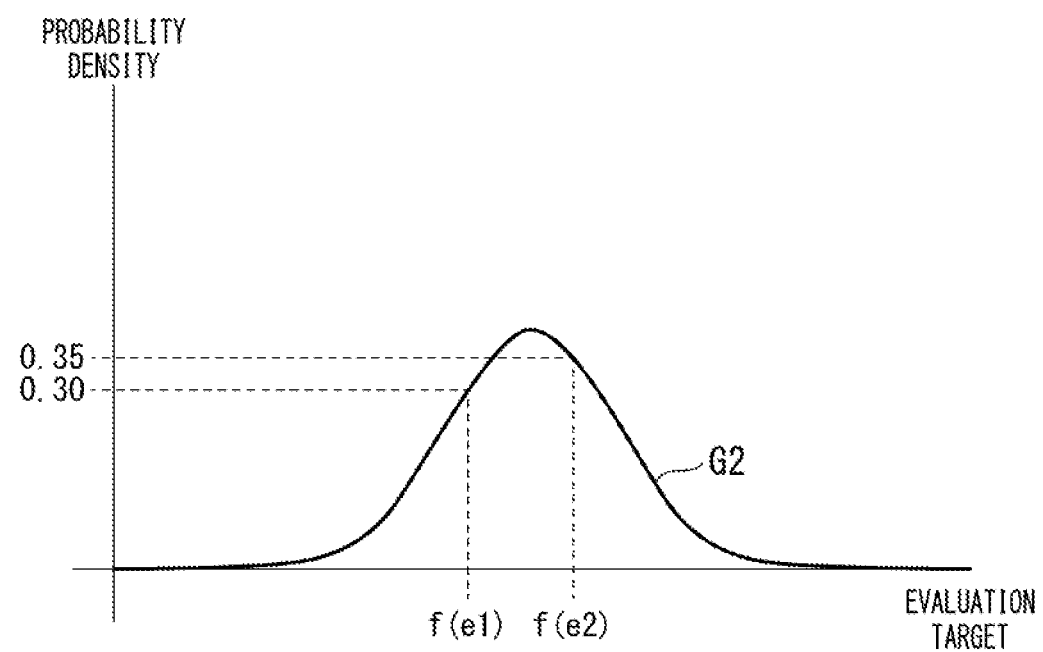
FIG. 7 is a diagram showing a specific example of a method of specifying a management value according to the second embodiment.

FIG. 7 is a diagram showing a specific example of a method of specifying a management value according to the second embodiment.

A case where a probability distribution of values to be evaluated is a distribution shown in FIG. 7 and the estimation unit 404 outputs an estimation value e1 based on a first model and an estimation value e2 based on a second model will be described. A graph G2 included in FIG. 6 is a graph in which a vertical axis represents a probability density and a horizontal axis represents a value of a probability distribution. The evaluation value calculation unit 409 calculates an evaluation value f(e1) which is a value of an evaluation item on the basis of the estimation value e1. In addition, the evaluation value calculation unit 409 calculates an evaluation value f(e2) which is a value of an evaluation item on the basis of the estimation value e2. Next the probability specification unit 406 obtains an appearance probability of the evaluation value f(e1) on the basis of a probability distribution of values of evaluation items. In the example shown in FIG. 7, a probability density of the appearance probability of the evaluation value f(e1) is 0.30. In addition, the probability specification unit 406 obtains an appearance probability of the evaluation value f(e2) on the basis of a probability distribution of values of evaluation items. In the example shown in FIG. 7, a probability density of the appearance probability of the evaluation value f(e2) is 0.35. In addition, the management value specification unit 407 specifies an estimation value used for the calculation of a higher appearance probability among appearance probabilities of specified evaluation values to be a management value. In the example shown in FIG. 7, since the appearance probability of the evaluation value f(e2) is higher than the appearance probability of the evaluation value f(e1), the management value specification unit 407 sets the estimation value e2 used for the calculation of the evaluation value f(e2) to be a management value.

«Operations and Effects»

In this manner, according to the second embodiment, the management device 40 specifies a value to be used for the management of the target device 10 from a plurality of estimation values on the basis of a probability distribution of values to be evaluated and calculated on the basis of a target state quantity. That is, according to the second embodiment, the management device 40 can appropriately set a value of a target state quantity to be used for the management of the target device 10 on the basis of an estimation value of a target state quantity calculated using each of models in consideration of a probability distribution of values to be evaluated.

Third Embodiment

The management device 40 according to the second embodiment sets a value of a target state quantity to be used for the management of the target device 10 on the basis of a probability distribution of values of evaluation items of management of the target device 10. Here, depending on an evaluation item, a value of the evaluation item may fluctuate due to a state quantity that cannot be measured or predicted.

For example, the amount of NOx emission which is one of evaluation items fluctuates depending on the concentration of oxygen during combustion and a time for which high-frequency combustion gas stays, but these values cannot be measured and predicted. Hereinafter, a state quantity that cannot be measured or predicted will be referred to as an unknown state quantity.

A management device 40 according to a third embodiment sets a value of a target state quantity to be used for the management of a target device 10 in consideration of an unknown state quantity. Meanwhile, a configuration of the management device 40 is the same as that in the second embodiment. However, a probability distribution storage unit 405 according to the third embodiment stores a probability distribution table in which a value of an evaluation item and a probability of taking the value are associated with each other for each value of an unknown state quantity. That is, the probability distribution table according to the third embodiment is a table showing a conditional probability distribution with a value of an unknown state quantity as a precondition. In the third embodiment, the probability distribution storage unit 405 stores a probability distribution table in a case where a value of an unknown state quantity falls within a first range (a comparatively large value), a probability distribution table in a case where a value of an unknown state quantity falls within a second range (a medium value), and a probability distribution table in a case where a value of an unknown state quantity falls within a third range (a comparatively small value).

«Operations of Management Device»

Figure 8:
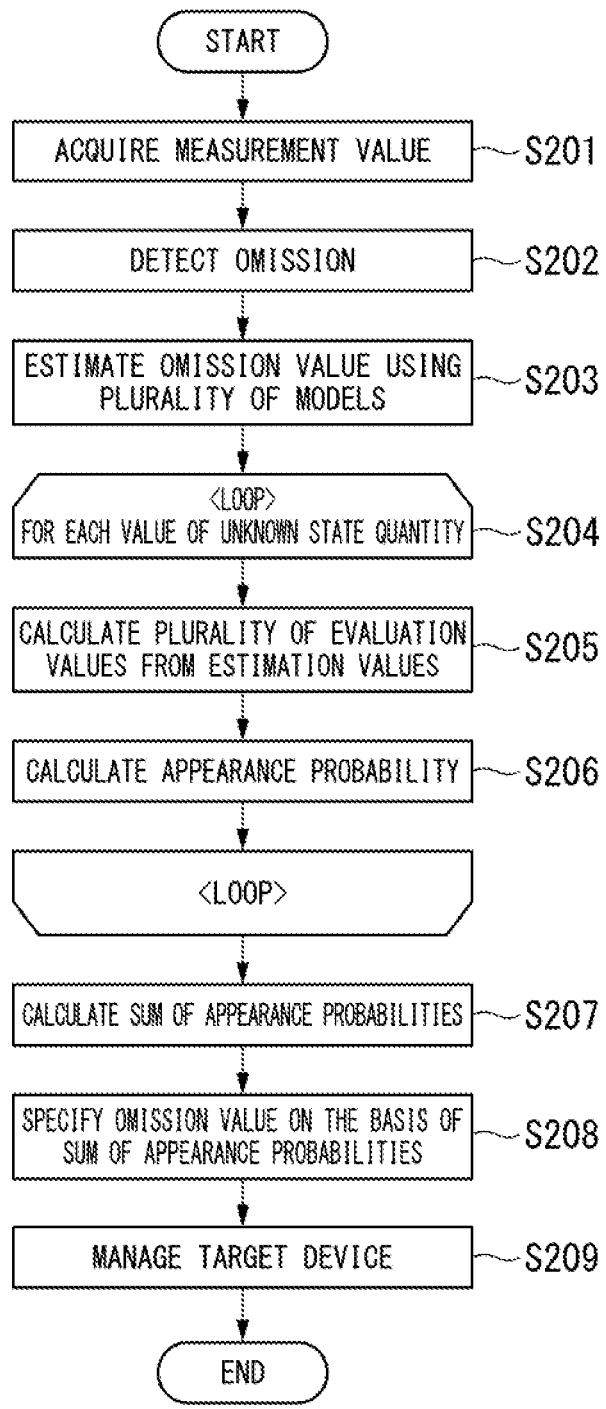
FIG. 8 is a flowchart showing operations of a management device according to a third embodiment.

FIG. 8 is a flowchart showing operations of the management device according to the third embodiment.

When the management device 40 starts to manage the target device 10, the measurement value acquisition unit 401 acquires a measurement value of a state quantity measured by the measurement instrument 20 from the communication device 30 (step S201). Next, an omission detection unit 402 detects the omission of a measurement value acquired by the measurement value acquisition unit 401 (step S202). An estimation unit 404 applies the measurement value acquired by the measurement value acquisition unit 401 to each of a plurality of models to obtain an estimation value of a state quantity of which the omission has been detected (step S203).

Next, the management device 40 selects values (a first range, a second range, and a third range) of unknown state quantities one by one (step S204), and executes processes of step S205 and step S206. That is, an evaluation value calculation unit 409 calculates values of a plurality of evaluation items on the basis of each of a plurality of estimation values estimated by the estimation unit 404, the values of the unknown state quantities which are selected in step S204, and the measurement value acquired in step S101 for each of the estimation values (step S205). A probability specification unit 406 specifies an appearance probability of each evaluation value on the basis of a probability distribution table associated with the values of the unknown state quantities which are selected in step S204 (step S206).

When the management device 40 calculates a plurality of appearance probabilities for each value of an unknown state quantity, a management value specification unit 407 calculates the sum of appearance probabilities for each evaluation value calculated from the same state quantity (step S207). That is, the management value specification unit 407 calculates the sum of an appearance probability of an evaluation value assuming that a value of an unknown state quantity falls within the first range as a precondition, an appearance probability of an evaluation value assuming that a value of an unknown state quantity falls within the second range as a precondition, and an appearance probability of an evaluation value assuming that a value of an unknown state quantity falls within the third range as a precondition for each evaluation value calculated from the same state quantity.

In addition, the management value specification unit 407 specifies the highest probability in the sum of probabilities calculated by the probability specification unit 406 and selects an estimation value used for the calculation of an evaluation value related to the probability to specify a value of a state quantity of which the omission has been detected (step S208). In addition, the management unit 408 manages the target device 10 on the basis of the measurement value acquired by the measurement value acquisition unit 401 and the value specified by the management value specification unit 407 (step S209).

«Specific Example of Operation»

Here, a method of specifying a management value according to the third embodiment will be described using a specific example.

Figure 9:
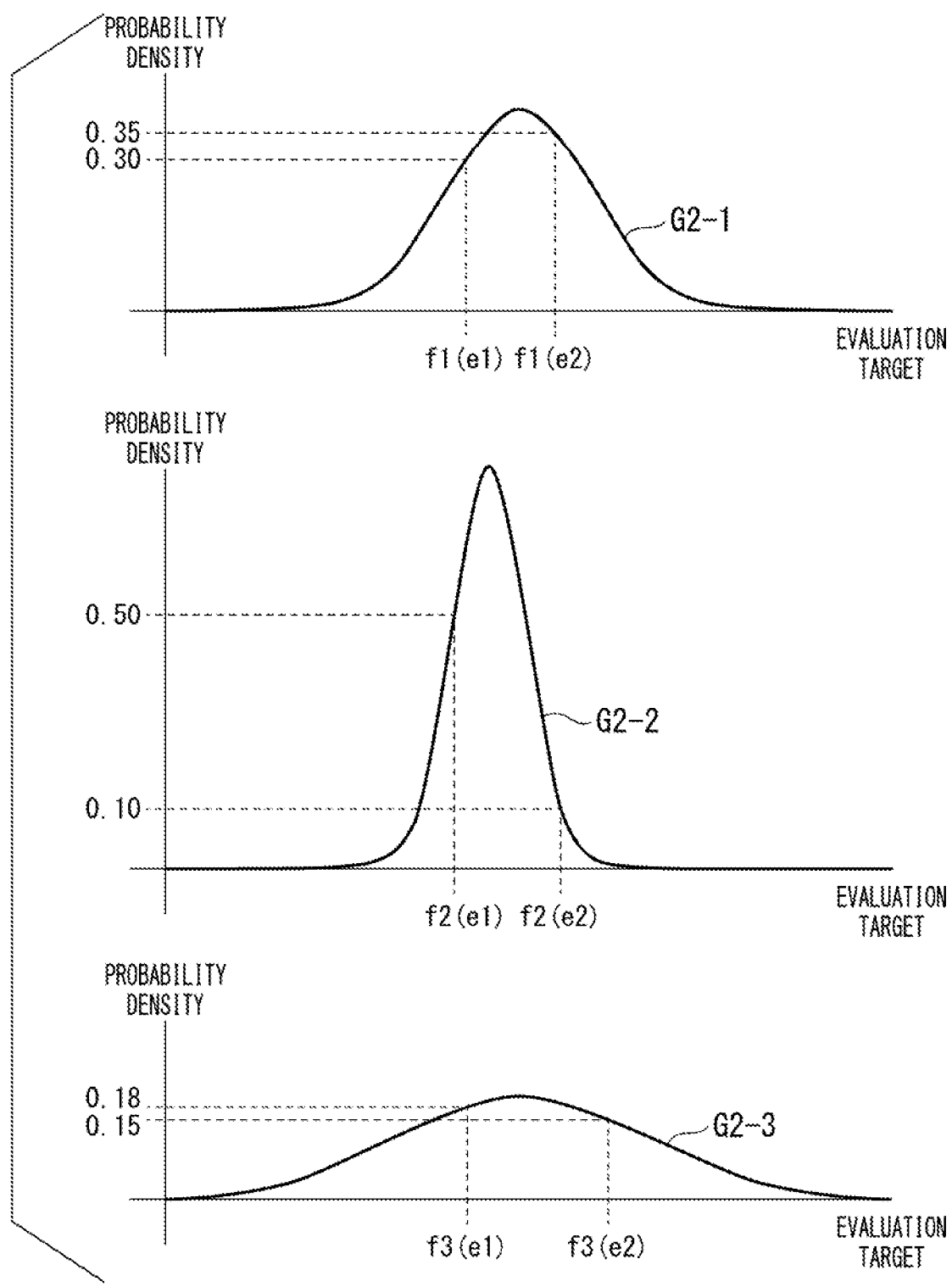
FIG. 9 is a diagram showing a specific example of a method of specifying a management value according to the third embodiment.

FIG. 9 is a diagram showing a specific example of a method of specifying a management value according to the third embodiment.

A case where a probability distribution of values to be evaluated changes as shown in FIG. 9 depending on a value of an unknown state quantity and the estimation unit 404 outputs an estimation value e1 based on a first model and an estimation value e2 based on a second model will be described.

All of a graph G2-1, a graph G2-2, and a graph G2-3 included in FIG. 9 are graphs in which a vertical axis represents a probability density and a horizontal axis represents a value of a probability distribution. The graph G2-1 shows a distribution of appearance probabilities of values to be evaluated when a value of an unknown state quantity is in the first range. The graph G2-2 shows a distribution of appearance probabilities of values to be evaluated when a value of an unknown state quantity is in the second range. The graph G2-3 shows a distribution of appearance probabilities of values to be evaluated when a value of an unknown state quantity is in the third range.

In step S204, the management device 40 selects a value in the first range as a value of an unknown state quantity. The evaluation value calculation unit 409 calculates an evaluation value f1(e1) which is a value of an evaluation item in a case where a value of an unknown state quantity is in the first range on the basis of the estimation value e1. In addition, the evaluation value calculation unit 409 calculates an evaluation value f1(e2) which is a value of an evaluation item in a case where a value of an unknown state quantity is in the first range on the basis of the estimation value e2. Next, the probability specification unit 406 obtains an appearance probability of the evaluation value f1(e1) on the basis of the probability distribution shown in the graph G2-1. In the example shown in FIG. 9, a probability density of the appearance probability of the evaluation value f1(e1) is 0.30. In addition, the probability specification unit 406 obtains an appearance probability of the evaluation value f1(e2) on the basis of the probability distribution shown in the graph G2-1. In the example shown in FIG. 9, a probability density of the appearance probability of the evaluation value f1(e2) is 0.35.

Next, the management device 40 selects a value in the second range as a value of an unknown state quantity. The evaluation value calculation unit 409 calculates an evaluation value f2(e1) which is a value of an evaluation item in a case where a value of an unknown state quantity is in the second range on the basis of the estimation value e1. In addition, the evaluation value calculation unit 409 calculates an evaluation value f2(e2) which is a value of an evaluation item in a case where a value of an unknown state quantity is in the second range on the basis of the estimation value e2. Next, the probability specification unit 406 obtains an appearance probability of the evaluation value f2(e1) on the basis of the probability distribution shown in the graph G2-2. In the example shown in FIG. 9, a probability density of the appearance probability of the evaluation value f2(e1) is 0.50. In addition, the probability specification unit 406 obtains an appearance probability of the evaluation value f2(e2) on the basis of the probability distribution shown in the graph G2-2. In the example shown in FIG. 9, a probability density of the appearance probability of the evaluation value f2(e2) is 0.10.

Next, the management device 40 selects a value in the third range as a value of an unknown state quantity. The evaluation value calculation unit 409 calculates an evaluation value f3(e1) which is a value of an evaluation item in a case where a value of an unknown state quantity is in the third range on the basis of the estimation value e1. In addition, the evaluation value calculation unit 409 calculates an evaluation value f3(e2) which is a value of an evaluation item in a case where a value of an unknown state quantity is in the third range on the basis of the estimation value e2. Next, the probability specification unit 406 obtains an appearance probability of the evaluation value f3(e1) on the basis of the probability distribution shown in the graph G2-3. In the example shown in FIG. 9, a probability density of the appearance probability of the evaluation value f3(e1) is 0.18. In addition, the probability specification unit 406 obtains an appearance probability of the evaluation value f3(e2) on the basis of the probability distribution shown in the graph G2-3. In the example shown in FIG. 9, a probability density of the appearance probability of the evaluation value f3(e2) is 0.15.

In addition, the management value specification unit 407 calculates the sum (0.30+0.50+0.18=0.98) of the appearance probabilities related to the evaluation values calculated on the basis of the estimation value e1. In addition, the management value specification unit 407 calculates the sum (0.35+0.10+0.15=0.60) of the appearance probabilities related to the evaluation values calculated on the basis of the estimation value e2. In addition, the management value specification unit 407 specifies an estimation value used for the calculation of a higher appearance probability in the sum of the specified appearance probabilities as a management value. In the example shown in FIG. 9, since the appearance probability of the evaluation value calculated on the basis of the estimation value e1 is higher than the appearance probability of the evaluation value calculated on the basis of the estimation value e2, the management value specification unit 407 sets the estimation value e1 to be a management value.

«Operations and Effects»

In this manner, according to the third embodiment, the management device 40 specifies an appearance probability of an evaluation value on the basis of a plurality of values that can be taken by an unknown state quantity and specifies a value to be used for the management of the target device 10 on the basis of the sum of probabilities corresponding to a plurality of evaluation values for each estimation value. Thereby, the management device 40 can appropriately set a value of a target state quantity to be used for the management of the target device 10 also in a case where there is an unknown value that cannot be measured and predicted in calculating a value to be evaluated.

Fourth Embodiment

According to the second and third embodiments, the management device 40 specifies a value of a target state quantity on the basis of an appearance probability of a value of a certain evaluation item. On the other hand, a management device 40 according to a fourth embodiment specifies a value of a target state quantity on the basis of values of a plurality of evaluation items. For example, the management device 40 specifies a value of a target state quantity on the basis of the value of the amount of NOx emission, the value of electricity sales revenues, and the value of the temperature of exhaust gas. Meanwhile, a configuration of the management device 40 is the same as that in the second embodiment.

«Operations of Management Device»

Figure 10:
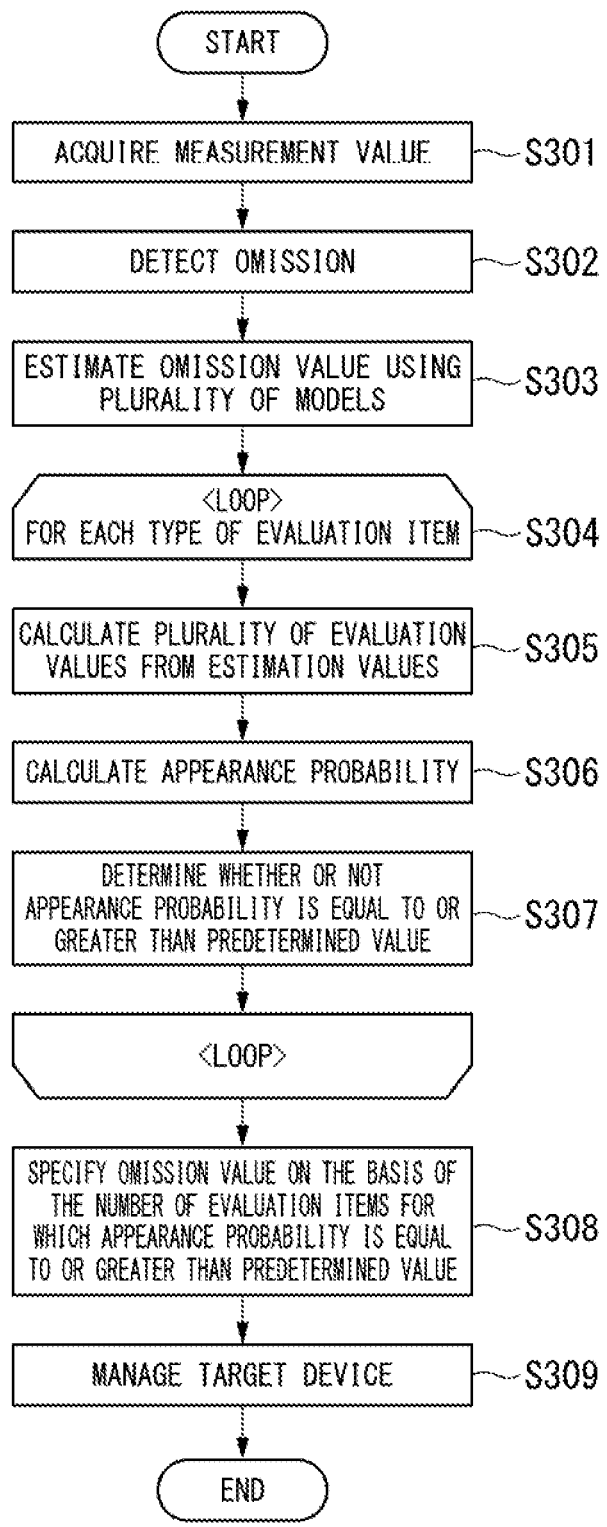
FIG. 10 is a flowchart showing operations of a management device according to a fourth embodiment.

FIG. 10 is a flowchart showing operations of the management device according to the fourth embodiment.

When the management device 40 starts to manage a target device 10, a measurement value acquisition unit 401 acquires a measurement value of a state quantity measured by a measurement instrument 20 from a communication device 30 (step S301). Next, an omission detection unit 402 detects the omission of the measurement value acquired by the measurement value acquisition unit 401 (step S302). An estimation unit 404 applies the measurement value acquired by the measurement value acquisition unit 401 to each of a plurality of models to obtain estimation values of state quantities of which the omission has been detected (step S303).

Next, the management device 40 selects types of evaluation items one by one to execute the following processes of steps S205 to S207 (step S204).

First, an evaluation value calculation unit 409 calculates values of evaluation items related to the types selected in step S204 on the basis of each of the plurality of estimation values estimated by the estimation unit 404 (step S205). Next, a probability specification unit 406 specifies an appearance probability of each evaluation value on the basis of a probability distribution stored in a probability distribution storage unit 405 (step S206). Next, a management value specification unit 407 determines whether or not the specified appearance probability is equal to or greater than a predetermined threshold value (for example, a probability density of 0.3) (step S207).

When it is determined whether or not an appearance probability is equal to or greater than the predetermined threshold value for an evaluation item of each type, the management value specification unit 407 specifies a value of a state quantity of which the omission has been detected by selecting an estimation value having the largest number of items in which an appearance probability is equal to or greater than the predetermined threshold value (step S208). In addition, a management unit 408 manages the target device 10 on the basis of the measurement value acquired by the measurement value acquisition unit 401 and the value specified by the management value specification unit 407 (step S209).

«Specific Example of Operation»

Here, a method of specifying a management value according to the fourth embodiment is described using a specific example.

Figures 11, 12:
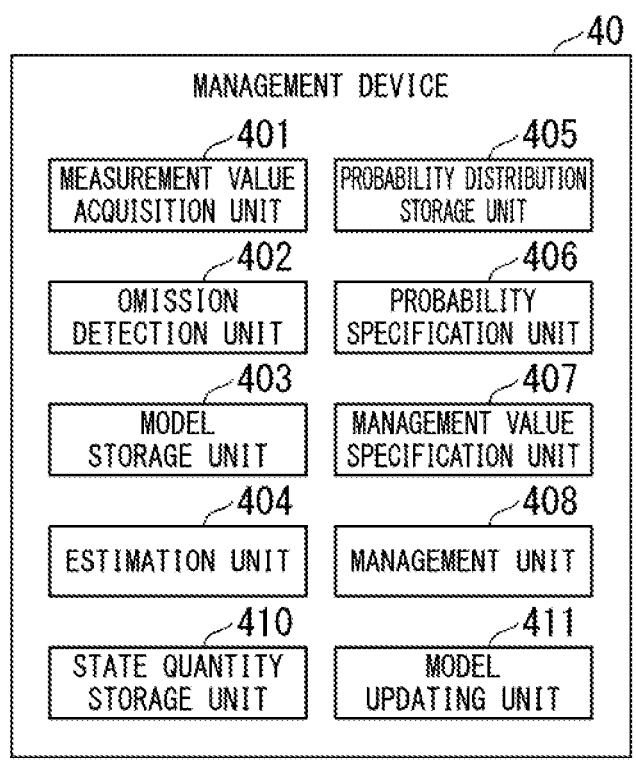
FIG. 11 is a diagram showing a specific example of a method of specifying a management value according to the fourth embodiment.
FIG. 12 is a schematic block diagram showing a configuration of a management device according to a fifth embodiment.

FIG. 11 is a diagram showing a specific example of a method of specifying a management value according to the fourth embodiment.

A case where the estimation unit 404 outputs an estimation value e1 based on a first model and an estimation value e2 based on a second model and types of evaluation items to be calculated are the amount of NOx emission, electricity sales revenues, and the temperature of exhaust gas will be described.

The evaluation value calculation unit 409 calculates an evaluation value of the amount of NOx emission, an evaluation value of electricity sales revenues, and an evaluation value of the temperature of exhaust gas on the basis of the estimation value e1. In addition, the evaluation value calculation unit 409 calculates an evaluation value of the amount of NOx emission, an evaluation value of electricity sales revenues, and an evaluation value of the temperature of exhaust gas on the basis of the estimation value e2. Next, the probability specification unit 406 obtains an appearance probability for each of the evaluation value of the amount of NOx emission, the evaluation value of electricity sales revenues, and the evaluation value of the temperature of exhaust gas which are obtained from the estimation value e1. Similarly, the probability specification unit 406 obtains an appearance probability for each of the evaluation value of the amount of NOx emission, the evaluation value of electricity sales revenues, and the evaluation value of the temperature of exhaust gas which are obtained from the estimation value e2.

Here, the management value specification unit 407 determines whether or not each of the appearance probability of the evaluation value of the amount of NOx emission which is obtained from the estimation value e1, the appearance probability of the evaluation value of electricity sales revenues which is obtained from the estimation value e1, the appearance probability of the evaluation value of the temperature of exhaust gas which is obtained from the estimation value e1, the appearance probability of the evaluation value of the amount of NOx emission which is obtained from the estimation value e2, the appearance probability of the evaluation value of electricity sales revenues which is obtained from the estimation value e2, and the appearance probability of the evaluation value of the temperature of exhaust gas which is obtained from the estimation value e2 is equal to or greater than a predetermined threshold value. Here, as shown in FIG. 11, it is assumed that the appearance probability of the evaluation value of the amount of NOx emission which is obtained from the estimation value e1, the appearance probability of the evaluation value of the amount of NOx emission which is obtained from the estimation value e2, and the appearance probability of the evaluation value of the temperature of exhaust gas which is obtained from the estimation value e2 are equal to or greater than a threshold value (indicated by "O" in FIG. 11), and the others are less than the threshold value (indicated by "X" in FIG. 11).

In addition, the management value specification unit 407 specifies an estimation value having the largest number of items for which an appearance probability is equal to or greater than the threshold value as a management value. In the example shown in FIG. 11, since the number of items for which an appearance probability is equal to or greater than the threshold value, among the evaluation items obtained from the estimation value e1, is one and the number of items for which an appearance probability is equal to or greater than the threshold value, among the evaluation items obtained from the estimation value e2, is two, the management value specification unit 407 sets the estimation value e2 to be a management value.

«Operations and Effects»

In this manner, according to the fourth embodiment, the management device 40 specifies a value to be used for the management of the target device 10 oil the basis of a plurality of evaluation items. Thereby, the management device 40 can appropriately set a value of a target state quantity to be used for the management of the target device 10 so that an evaluation item to be used for the management of the target device 10 has an appropriate value.

Meanwhile, in the fourth embodiment, the management device 40 specifies a management value on the basis of the number of items for which an appearance probability is equal to or greater than a threshold value, but is not limited thereto. For example, in other embodiments, the management device 40 may specify a management value on the basis of the sum of appearance probabilities and a weighted average for each evaluation item or may specify a management value on the basis of the number of items having the highest appearance probability.

Fifth Embodiment

According to the first to fourth embodiments, the management device 40 generates an estimation value of a state quantity on the basis of a plurality of models. In a fifth embodiment, operations in a case where one of a plurality of models is a statistical model will be described.

«Configuration of Management Device»

FIG. 12 is a schematic block diagram showing a configuration of a management device according to the fifth embodiment.

A management device 40 according to the fifth embodiment further includes a state quantity storage unit 410 and a model updating unit 411 in addition to the components in the first embodiment. The model updating unit 411 updates a statistical model among a plurality of models stored in a model storage unit 403 on the basis of values of the past state quantities stored in the state quantity storage unit 410.

«Operations of Management Device»

Figure 13:
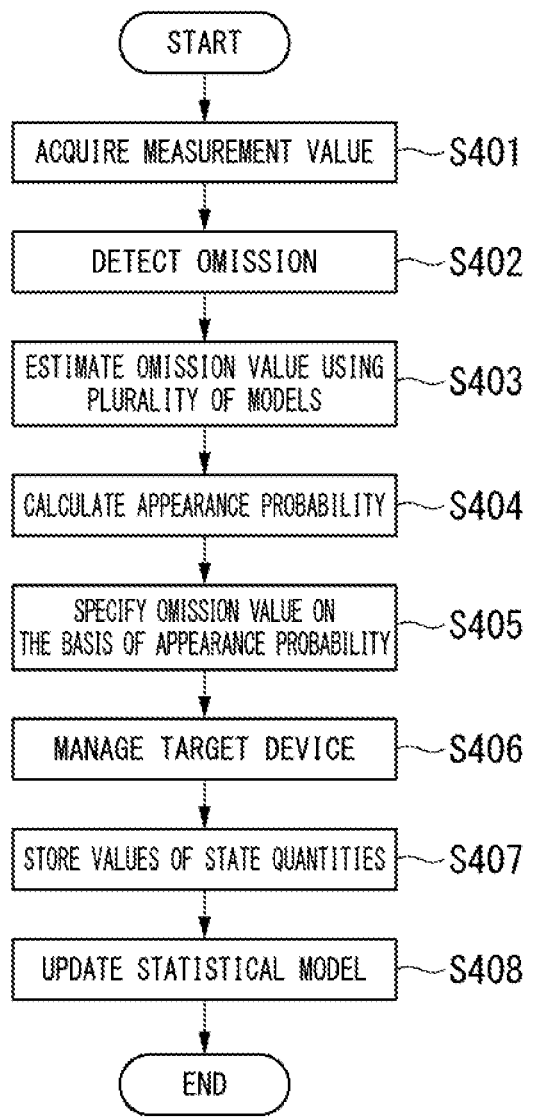
FIG. 13 is a flowchart showing operations of the management device according to the fifth embodiment.

FIG. 13 is a flowchart showing operations of the management device according to the fifth embodiment.

When the management device 40 starts to manage the target device 10, the measurement value acquisition unit 401 acquires a measurement value of a state quantity by a measurement instrument 20 from a communication device 30 (step S401). Next, the omission detection unit 402 detects the omission of the measurement value acquired by the measurement value acquisition unit 401 (step S402). An estimation unit 404 applies the measurement value acquired by the measurement value acquisition unit 401 to each of a plurality of models including a statistical model to obtain each of estimation values of state quantities (target state quantities) of which the omission has been detected (step S403).

Next, a probability specification unit 406 specifies an appearance probability of each estimation value on the basis of a probability distribution stored in a probability distribution storage unit 405 (step S404). In addition, a management value specification unit 407 specifies the highest probability among probabilities specified by the probability specification unit 406 and selects an estimation value related to the probability to specify a value of a state quantity of which the omission has been detected (step S405). A management unit 408 manages the target device 10 on the basis of the measurement value acquired by the measurement value acquisition unit 401 and the value specified by the management value specification unit 407 (step S406). The measurement value acquisition unit 401 and the management value specification unit 407 stores values used for the management of the target device 10 in a state quantity storage unit 410 (step S407). In addition, the model updating unit 411 updates a statistical model stored in the model storage unit 403 on the basis of the values stored in the state quantity storage unit 410 (step S408).

«Operations and Effects»

In this manner, according to the fifth embodiment, the estimation unit 404 can estimate a value of a state quantity by using a statistical model updated at a timing of the previous management at each management timing. The probability specification unit 406 specifies an appearance probability of an estimation value using the updated statistical model. That is, according to the fifth embodiment, it is possible to estimate a statistical estimation value with higher accuracy by updating not only statistical data but also a statistical model itself at each management timing.

Meanwhile, the management device 40 according to the fifth embodiment updates a statistical model on the basis of values of the past state quantities, but is not limited thereto. For example, in other embodiments, the management device 40 may not update a statistical model while storing a state quantity in the state quantity storage unit 410. Also in this case, the accuracy of estimation using a statistical model may be improved by storing the values of the past state quantities. For example, an estimation value of an average value approaches a true value according to the "Law of Large Numbers" by the storage of data, and the range of dispersion is narrowed down, so that an improvement in estimation accuracy can be expected.

Other Embodiments

Although an embodiment has been described above in detail with reference to the accompanying drawing, a specific configuration is not limited to the above-described configurations, and various design changes and the like can be made.

For example, the management device 40 in the management system 1 according to the above-described embodiment has a function of extracting and specifying a value to be used for the management of the target device 10, but is not limited thereto. For example, in the management systems 1 according to the other embodiments, an information processing device extracting and specifying a value to be used for the management of the target device 10 may be provided separately from the management device 40, and the management device 40 may manage the target device 10 using the value specified by the information processing device.

In addition, for example, the management device 40 according to the above-described embodiment acquires a measurement value through the network N, but is not limited thereto. For example, the management devices 40 according to the other embodiments may directly acquire a measurement value from the measurement instrument 20. In this case, the management system 1 may not include the communication device 30.

In addition, according to the above-described embodiments, the management device 40 selects one of a plurality of estimation values to set the selected estimation value to be a value of a state quantity to be used for the management of the target device 10, but is not limited thereto. For example, in other embodiments, the management device 40 may obtain a weighted average value of estimation values using weight coefficients according to appearance probabilities to set the obtained weighted average value to be a value of a state quantity to be used for the management of the target device 10. The weight coefficient of each estimation value is monotonously increased with respect to an appearance probability. The management device 40 may use, for example, an appearance probability of an estimation value as it is as a weight coefficient.

In addition, according to the above-described embodiments, the management device 40 obtains a value of which the omission has been detected through estimation, but is not limited thereto. For example, in other embodiments, the management device 40 may obtain a value of a state quantity through estimation regardless of the presence or absence of omission and may specify a value to be used for the management of the target device 10 on the basis of a probability distribution for each of a measurement value and an estimation value.

<Configuration of Computer>

Figure 14:
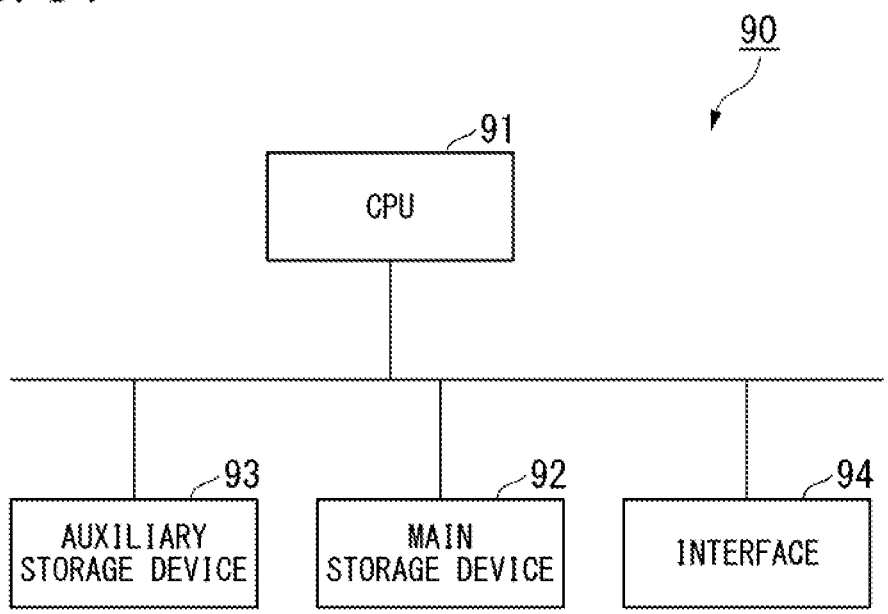
FIG. 14 is a schematic block diagram showing a configuration of a computer according to at least one embodiment.

FIG. 14 is a schematic block diagram showing a configuration of a computer according to at least one embodiment.

A computer 90 includes a CPU 91, a main storage device 92, an auxiliary storage device 93, and an interface 94.

The management device 40 mentioned above is mounted on the computer 90. In addition, operations of the above-described processing units are stored in the auxiliary storage device 93 in a format of a program. The CPU 91 reads out a program from the auxiliary storage device 93, develops the program in the main storage device 92, and executes the above-described processing in accordance with the program. In addition, the CPU 91 secures a storage area corresponding to the model storage unit 403 and the probability distribution storage unit 405 in the main storage device 92 in accordance with a program.

Examples of the auxiliary storage device 93 include a hard disk drive (HDD), a solid state drive (SSD), a magnetic disc, a magneto-optical disc, a compact disc read only memory (CD-ROM), a digital versatile disc read only memory (DVD-ROM), a semiconductor memory, and the like. The auxiliary storage device 93 may be an internal medium directly connected to a bus of the computer 90 or may be an external medium connected to the computer 90 through the interface 94 or a communication line. Further, in a case where the program is distributed to the computer 90 through a communication line, the computer 90 having the program distributed thereto may be developed in the main storage device 92 and may execute the above-described processing. In at least one embodiment, the auxiliary storage device 93 is a non-transitory tangible storage medium.

In addition, the program may be a program for realizing some of the above-described functions. Further, the program may be a so-called differential file (differential program) for realizing the above-described functions by a combination with other programs stored in the auxiliary storage device 93 in advance.

INDUSTRIAL APPLICABILITY

The information processing device according to the present invention can appropriately set a value of a state quantity to be used for management of a target device on the basis of an estimation value of a target state quantity calculated using each model in consideration of a probability distribution of values of state quantities.

REFERENCE SIGNS LIST

1 Management system
10 Target device

20 Measurement instrument
30 Communication device
40 Management device (information processing device)
401 Measurement value acquisition unit
402 Omission detection unit
403 Model storage unit
404 Estimation unit
405 Probability distribution storage unit
406 Probability specification unit
407 Management value specification unit
408 Management unit
409 Evaluation value calculation unit
410 State quantity storage unit
411 Model updating unit

The invention claimed is:

1. An information processing device comprising:
   a computer including a CPU and a storage device storing a program;
   wherein the computer executes the program so as to function as:
      a measurement value acquisition unit which is configured to receive measurement values of state quantities measured by a plurality of measurement instruments;
      an estimation unit which is configured to estimate each of a plurality of estimation values related to a target state quantity by using a plurality of models for explaining a target device on the basis of the measurement values;
   an evaluation value calculation unit which is configured to calculate each of a plurality of evaluation values which are values of evaluation items of management of the target device on the basis of the plurality of estimation values,
   a probability specification unit which is configured to specify each of a plurality of probabilities corresponding to the plurality of evaluation values on the basis of a probability distribution of values of the evaluation items;
   a management value specification unit which is configured to specify a management value to be used for management of the target device on the basis of the plurality of estimation values and the plurality of probabilities;
   a management unit which is configured to manage the target device on the basis of the measurement values and the specified management value;
   wherein the target device is a gas turbine, and
      the management unit manages the gas turbine by at least one action selected from the group consisting of changing a gas turbine output instruction value, changing the setting of an opening of an IGV, and changing a fuel flow rate, on the basis of the measurement values and the management value.

2. The information processing device according to claim 1, further comprising:
   an omission detection unit which is configured to detect a state quantity of which the value is omission among state quantities to be processed as the target state quantity, on the basis of the plurality of measurement values.

3. The information processing device according to claim 1, wherein the evaluation value calculation unit is configured to calculate each of a plurality of evaluation values for the plurality of estimation values on the basis of a plurality of values which can be taken by an unknown state quantity which is a state quantity having an unknown value, the probability specification unit is configured to specify the plurality of probabilities respectively corresponding to the plurality of evaluation values for the plurality of estimation values on the basis of a conditional probability distribution of the values of the evaluation items with a value of the unknown state quantity as a precondition, and the management value specification unit is configured to specify a value to be used for management of the target device on the basis of a sum of probabilities corresponding to the plurality of evaluation values for the plurality of estimation values.

4. The information processing device according to claim 1, wherein the evaluation value calculation unit is configured to calculate a plurality of evaluation values related to the evaluation items of a plurality of types on the basis of the plurality of estimation values, and the management value specification unit is configured to specify a value to be used for management of the target device on the basis of probabilities corresponding to the evaluation items of a plurality of types for each of values of the plurality of target state quantities.

5. The information processing device according to claim 1, wherein the management value specification unit is configured to specify the value of the target state quantity related to the highest probability as a value to be used for management of the target device.

6. The information processing device according to claim 1, wherein the plurality of models include at least any one of a statistical model and a physical model.

7. The information processing device according to claim 6, further comprising:
   a model updating unit which updates the statistical model on the basis of values of past state quantities,
   wherein the probability specification unit is configured to specify a probability corresponding to an estimation value estimated using the updated statistical model.

8. An information processing method comprising:
   receiving, by a computer, measurement values of state quantities measured by a plurality of measurement instruments;
   estimating, by the computer, each of a plurality of estimation values related to a target state quantity by using a plurality of models for explaining a target device on the basis of the measurement values;
   calculating, by the computer, each of a plurality of evaluation values which are values of evaluation items of management of the target device on the basis of the plurality of estimation values;
   specifying, by the computer, each of a plurality of probabilities corresponding to the plurality of evaluation values on the basis of a probability distribution of values of the evaluation items;
   specifying, by the computer, a management value to be used for management of the target device on the basis of the plurality of estimation values and the plurality of probabilities;
   managing, by the computer, the target device on the basis of the measurement values and the specified management value;
   wherein the target device is a gas turbine, and
   managing the gas turbine by at least one action selected from the group consisting of changing a gas turbine output instruction value, changing the setting of an opening of an IGV, and changing a fuel flow rate, on the basis of the measurement values and the management value.

9. The information processing method according to claim 8, further comprising the step of:

detecting a state quantity of which the value is omission among state quantities to be processed as the target state quantity, on the basis of the plurality of measurement values.

10. A non-transitory computer-readable computer medium storing a program causing a computer to:
- receive measurement values of state quantities measured by a plurality of measurement instruments;
- estimate each of a plurality of estimation values related to a target state quantity by using a plurality of models for explaining a target device on the basis of the measurement values;
- calculate each of a plurality of evaluation values which are values of evaluation items of management of the target device on the basis of the plurality of estimation values;
- specify each of a plurality of probabilities corresponding to the plurality of evaluation values on the basis of a probability distribution of values of the evaluation items;
- specify a management value to be used for management of the target device on the basis of the plurality of estimation values and the plurality of probabilities;
- managing the target device on the basis of the measurement values and the specified management value;
- wherein the target device is a gas turbine, and
- managing the gas turbine by at least one action selected from the group consisting of changing a gas turbine output instruction value, changing the setting of an opening of an IGV, and changing a fuel flow rate, on the basis of the measurement values and the management value.

11. The non-transitory computer-readable computer medium storing a program according to claim 10, further causing a computer to:
- detect a state quantity of which the value is omission among state quantities to be processed as the target state quantity, on the basis of the plurality of measurement values.

* * * * *